United States Patent [19]
Williams

[11] 3,792,434
[45] Feb. 12, 1974

[54] BEARING TEMPERATURE SENSING APPARATUS FOR USE ON A TRAILER

[76] Inventor: James G. Williams, 305 Chelsea Ln., Friendswood, Tex. 77546

[22] Filed: July 14, 1972

[21] Appl. No.: 271,919

[52] U.S. Cl.............. 340/57, 340/269, 246/169 A
[51] Int. Cl............................................. B60q 1/00
[58] Field of Search .. 340/57, 269, 270; 246/169 A, 246/169 R

[56] References Cited
UNITED STATES PATENTS

| | | | |
|---|---|---|---|
| 3,380,021 | 4/1968 | Dudar | 340/269 X |
| 1,919,693 | 7/1933 | Faus | 246/169 A |
| 3,183,043 | 5/1965 | Creeger et al. | 340/269 UX |
| 2,558,736 | 7/1951 | Crews | 246/169 A |

Primary Examiner—Alvin H. Waring
Attorney, Agent, or Firm—Donald Gunn

[57] ABSTRACT

An apparatus which incorporates a thermistor mounted in a stub axle being specially modified by the presence of an axial bore therein wherein the thermistor is positioned within the axle at a point between the bearing surfaces on the exterior thereof and further incorporating a conductor line which extends to an indicating apparatus located elsewhere. The indicating apparatus utilizes a DC power supply which is connected through a relay winding which reverses the operative status of relay contacts to form a visible indication of overheating of the bearings supported on the axle. Current flows from the source through the relay winding and thermistor to ground.

10 Claims, 5 Drawing Figures

3,792,434

BEARING TEMPERATURE SENSING APPARATUS FOR USE ON A TRAILER

PRIOR ART

U.S. Pat. Nos. 2,089,369; 2,961,875; 2,187,958; 2,976,523; 2,420,968; 3,052,123; 2,429,817; 3,197,632; 3,548,396.

BACKGROUND OF THE INVENTION

A substantial industry has been developed in the last few years in the manufacture of trailers used to haul camping gear, fold-out tent mechanisms, boats and the like. Such trailers are not normally built with the structural strength, integrity and protective devices normally found in larger and more expensive trailers. Their construction is normally adequate for their intended purposes but they usually do not incorporate protection against many hazards of operation.

A significant hazard of operation in the use of a trailer is the overheating of a wheel bearing. Normally, trailers incorporate a fixed short stub axle which extends from a non-rotating member which is supported on the springs beneath the frame of the trailer. The axle receives a pair of bearing assemblies thereon to support a hub which is bolted to a rim. Overheating of a bearing is extremely dangerous to the operation of the trailer and towing vehicle. When a bearing becomes overheated, normally the operator has little or no warning of the bearing failure. The operator will simply drive on until the bearing failure becomes catastrophic. In such instances, the catastrophic failure will be indicated by a blow out of the tire, visible smoke emerging from the bearing assembly, loss of a wheel, and so on. Such catastrophic failures are extremely hazardous to the owner and operator. Car wrecks on high speed highways have occurred because of bearing failure in a trailer.

SUMMARY OF THE INVENTION

The present invention incorporates equipment which can modify a prexistent trailer, or be installed on a new trailer at the time of manufacture. It is intended for use with a trailer having an axle connected by means of the typical spring arrangement beneath the frame of the trailer. The axle is non-rotative, and is connected near its outer end to a fixed axle. The axle has a pair of bearing surfaces and is adapted to receive two sets of bearing assemblies. The bearing assemblies support a hub which is then bolted to a rim supporting a tire. The present invention contemplates the drilling of an axial passage through the axle to a point centered between the two bearing assemblies. A thermistor is positioned in the shaft. The thermistor is connected by means of suitable conductors with an indicating circuit. One form of indicating circuit utilizes a series arrangement incorporating a DC supply, the winding of a relay, and a thermistor connected to ground. The relay closes relay contact connected in series with an indicator light or audible alarm. The indicator light and relay contact are also connected from the source to ground. When the thermistor senses a rise in temperature, its resistance drops and the change in resistance increases the current flow through the relay. The relay is thus operated, closing the contacts and forming a visible indication. Depending on the range of thermistor selected, different temperature alarm levels can be obtained. Typically, an indicating level of about 165° is used which prevents damage to the wheel and trailer.

DESCRIPTION OF THE PREFERRED EMBODIMENT

Figure 2:
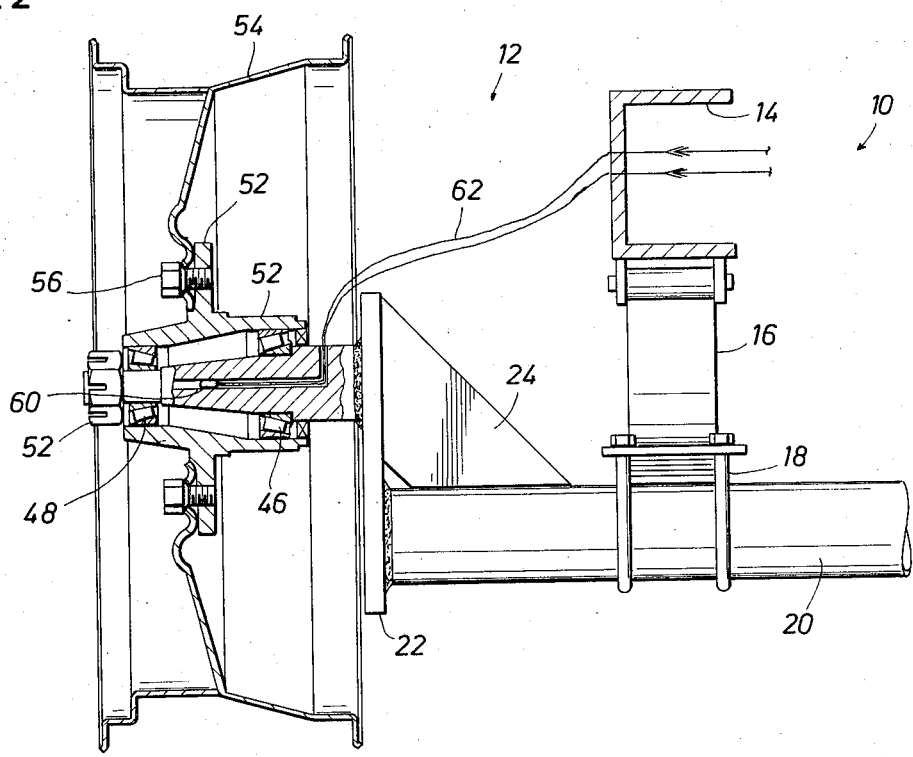
FIG. 2 is a sectional view through a trailer modified to incorporate the temperature protection system of the present invention and utilizing the modified stub axle of FIG. 1.

Attention is first directed to FIG. 2 of the drawings where the numeral 10 identifies a trailer of the type specified for use with the present invention. The trailer 10 has been modified to incorporate the present invention which is indicated generally by the numeral 12. The protection system of the present invention incorporates additional apparatus not shown in FIG. 2 but which will be described hereinafter. The trailer 10 incorporates a frame member 14 connected in the customary manner to an elongate leaf spring 16. From the center of the spring, a shackle 18 extends around a fixed axle 20. The axle 20 spans the width of the trailer and transfer the weight of the trailer and its load to the wheels. As will be understood, the springs 16 are positioned on both sides of the trailer to cushion and stablize the trailer and its load.

The fixed axle 20 extends outwardly toward the side of the trailer and supports an upright plate 22. A gusset 24 assists in positioning and reinforcing the upright plate 22. The plate 22 is joined, by welding, to a stub axle 26. One such axle is shown in FIG. 1 in enlarged view, specially modified to incorporate the present invention.

Figure 1:
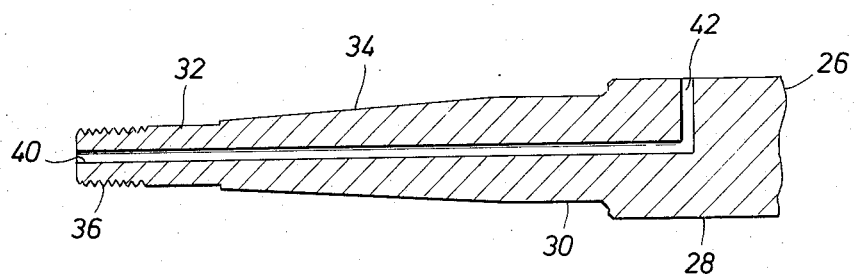
FIG. 1 is a sectional view through a stub axle which has been modified to cooperate with the present invention.

Attention is momentarily directed to FIG. 1 of the drawings. The stub axle is a nonrotating axle. It is relatively short in length, approximating perhaps eight to fifteen inches. It can be longer when a tandem arrangement is contemplated. The stub axle shown in FIG. 1 is intended for use with a single wheel. The stub axle incorporates a substantial thick portion at 28 which has the maximum diameter. The numeral 30 identifies a first bearing flat while the numeral 32 identifies a second bearing flat. These flats are perfectly concentric and circular about the body of the axle 26. They are spaced from one another and separated by a tapered surface 34. The tapered surface spans a few inches between the bearings flats 30 and 32. It will be observed that the specimen of stub axle shown in FIG. 1 tapers to a smaller diameter at the bearing flat 32. Some short fixed non-rotative stub axles incorporate bearing surfaces 30 and 32 which are equal in diameter and in that event, the surface 34 is cylindrical, not tapered. FIG. 1 illustrates the more common and popular version of stub axle wherein a taper is found between the two bearing flats.

The outer end of the stub axle is threaded at 36 to receive a crown nut as will be described. For incorporation in the present invention, an axial hole 40 is drilled into the stub axle. The passage 40 extends inboard, past both bearing surfaces. A radially outwardly directed hole 42 intercepts the axial passage. It is preferably to center the axial passage where it passes through the bearing surfaces.

The modifications contemplated for the present invention provide a passage means whereby a thermistor is positioned approximately equidistant between the two bearing surfaces 30 and 32. Moreover, the radial passage 42 serves as a port from which electrical wires emerge for connection with the remainder of the equipment on the vehicle. The lateral or radial passage 42 is sufficiently inboard to clear all the assemblies associated with the bearing and hub as will be described. This is more clearly shown in FIG. 2.

Returning to FIG. 2, a first bearing assembly indicated by the numeral 46 is positioned about the bearing surface 30. A second bearing assembly 48 is positioned about the smaller bearing surface. The two bearing assemblies 46 and 48 support a hub 50. The hub 50 has an internal axial passage contoured to rest on the two bearing assemblies as shown in FIG. 2. The hub 50 is locked in position by means of a crown nut 52 which is threaded on the outer end of the fixed shaft 26. Preferably, a cotter pin is passed through the grooves in the crown nut and through a hole drilled perpendicular to the passage 40 previously described. This secures the bearing assemblies 46 and 48 in position and supports the hub 50 at the proper location. It will be observed that the hub 50 rotates on the bearing assemblies about the shaft 26 functioning as an axle.

An external flange 52 extends from the hub. The flange 52 is suitable for connection to a rim 54. The rim 54 is joined to the hub 52 by means of lug bolts 56. A ring of typically four to six lug bolts is used to secure the rim to the hub. The rim 54 has a pair of external beads which support and position a tire about the rim.

The numeral 60 identifies a thermistor which is placed in the axial passage 40. The thermistor is preferably only slightly smaller than the axial passage, and is preferably held in position by means of epoxy or other filling material which is inserted from either end to fix the thermistor 60 in position. The thermistor 60 is connected to a pair of conductors 62 which lead to additional circuitry as will be described. The thermistor 60 is preferably positioned at a mid-point between the two bearing assemblies 46 and 48. It will be appreciated that either bearing may wear out first. When either of the bearings becomes worn, unlubricated or otherwise operated in less than optimum circumstances, the amount of heat generated in the bearing from the friction of rotation increases. The heat is conducted into the various metallic parts in contact with the bearings. Of course, some of the heat is conducted into the hub 50. However, a substantial amount of heat is conducted into the shaft 26 which supports the entire wheel assembly. As the heat is transferred into the shaft, the temperature in the thermistor is elevated. The thermistor responds to the increase in temperature to form an electrical signal in the manner to be described which is used to sound an alarm, indicating imminent bearing failure. The position of the thermistor 60 is so calculated to form an alarm, in conjunction with the apparatus to be described, that alerts the drive sufficiently rapidly to avoid the occurrance of damage to the bearing assemblies and the wheel.

Figure 3:
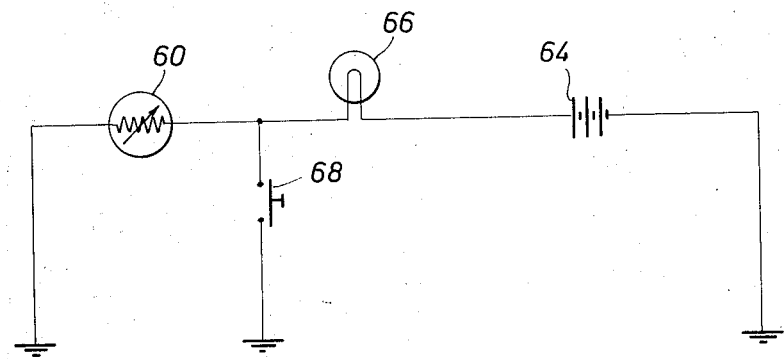
FIG. 3 illustrates a first alarm indication circuit.

Attention is next directed to FIG. 3 of the drawings which illustrates a rather simplified but highly successful electronic means for use with the present invention. The numeral 60 identifies the thermistor schematically included in the circuitry. The numeral 64 identifies a DC voltage source which can be the automotive electrical system normally found on a vehicle. The numeral 66 identifies a series lamp which is in series with the thermistor 60 which is grounded at one side. When the thermistor 60 is cool, the drop across the lamp 66 is so small as to not illuminate the lamp. For instance, the thermistor might have a nominal resistance of about 100 to 1,000 ohms. However, when the thermistor 60 is heated to a selected temperature level, the terminal resistance might drop as low as about 5 ohms. This drop enables additional current to flow through the lamp 66. As the current flow increases, the lamp approaches incandescence and glows in a manner to be seen or observed. Preferably, the lamp 66 is installed in the towing vehicle at such a location to enable the operator to see the lamp. It is installed by the use of a long wire and plug and socket. A test switch 68 momentarily shorts the lamp to ground to thereby enable the operator to test the lamp.

Figure 4:
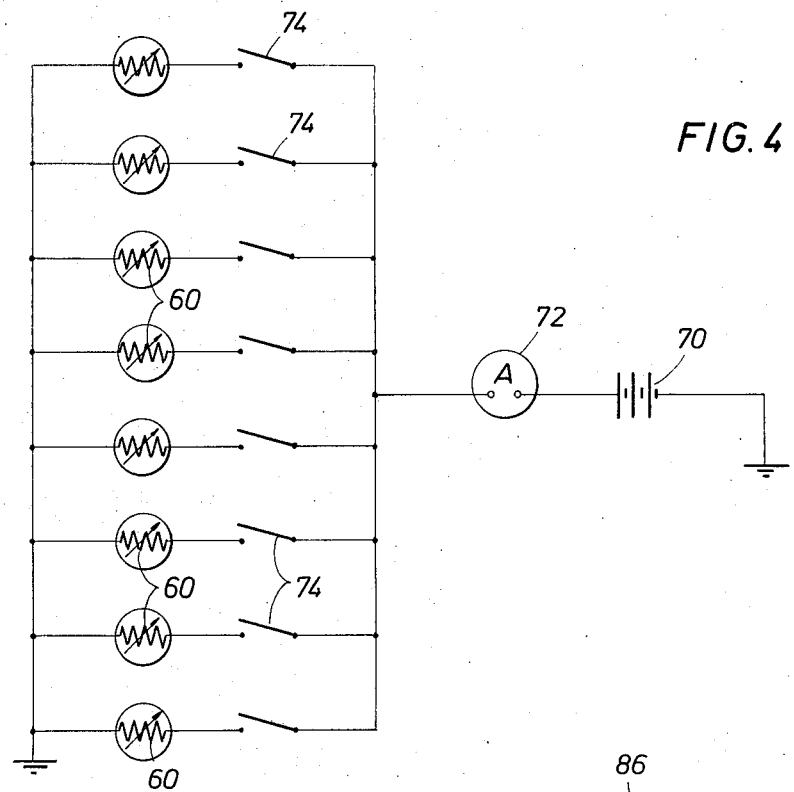
FIG. 4 indicates a second or alternative alarm indication circuit means for use with the present invention; and, FIG. 5 represents the preferred embodiment of alarm indicating circuitry for use with the present invention.

The circuitry shown in FIG. 3 is adapted for use with a single wheel. The circuitry shown and illustrated in FIG. 4 is similar to that of FIG. 3, but is adapted to be used with several trailer wheels. The illustration incorporates eight individual thermistors although this number can clearly be increased or decreased with impunity. In FIG. 4, the numeral 70 identifies a voltage source which again can be the automotive electrical system. An ammeter 72 is connected in parallel to a number of switches 74, each of which is connected in series with a single thermistor. The thermistors are all grounded at one side.

For a given wheel, current flows from the source 70 through the ammeter 72, the switch 74 and the series thermistor 60 to ground. Again, when the thermistor is heated, its terminal resistance drops and the flow through the ammeter 72 increases. Preferably, the ammeter 72 is calibrated, not in current flow, but in degrees Fahrenheit to indicated the bearing temperature. It will be observed that several thermistors are connected in parallel and in the event that two or more switches are closed an increased current flow through the meter movement 72 will be observed. The switches 74 can be used in any desired manner. One manner of operation is to periodically close each switch 74 to obtain a visual indication of the temperature of the thermistor sensing device associated with a particular wheel. This can be expedited through the use of a rotary switch as opposed to single pole, single throw switches as illustrated in FIG. 4. The rotary switch should be operated periodically through all of the positions to test all of the wheels which are protected by the present invention.

Figure 5:
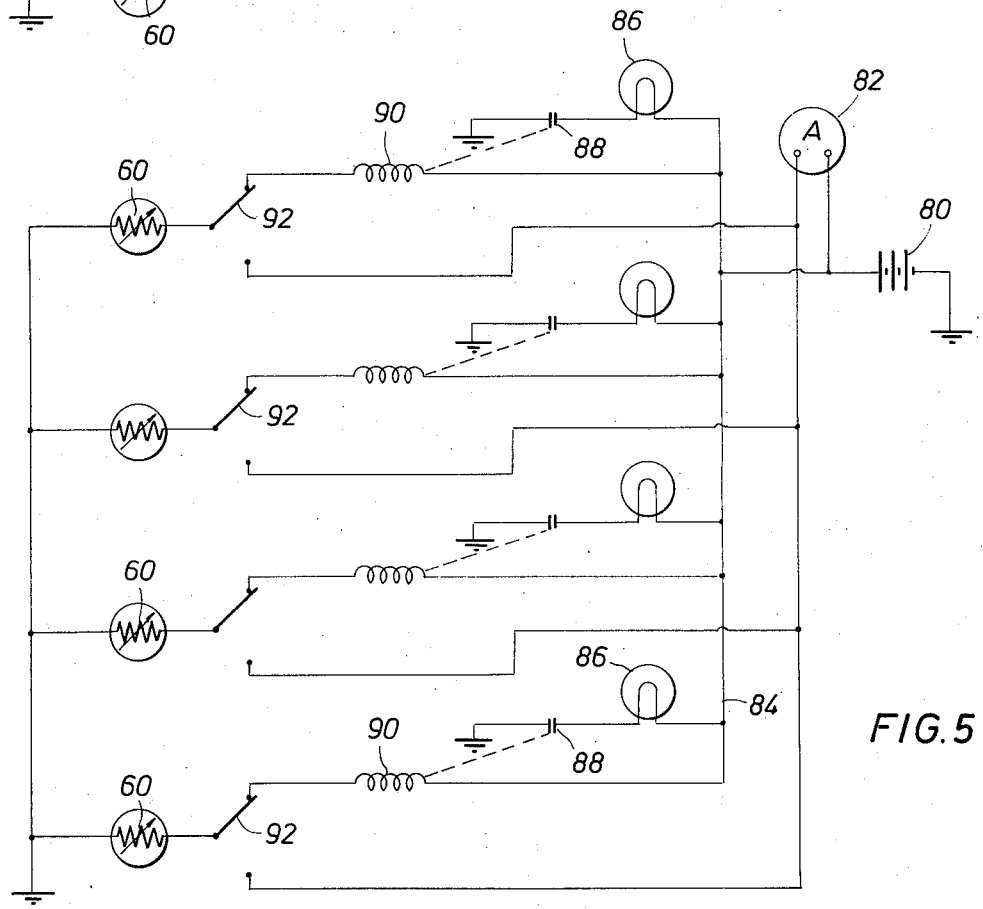

A more expensive apparatus is shown in FIG. 5 of the drawings. A voltage source 80 is connected to an additional ammeter movement 82. DC power is applied directly to a conductor 84. The conductor 84 communicates with a single lamp 86 in series with a relay contact 88 which is then grounded. The conductor 84 also communicates through the winding 90 of the relay which then is communicated with a switch 92 and a thermistor 60 which is grounded.

The arrangement of FIG. 5 is illustrated for four-wheel protection. Again, the number can be increased or decreased. Each wheel has its own alarm system which is continuously monitored in contrast with the arrangement with FIG. 4. The operation of the circuitry of of FIG. 5 is as follows. When the thermistor 60 becomes heated, current flows through it is increased. This increase in current flow is sensed by a coil 90 comprising a portion of a relay. The coil 90 closes the relay contacts 88. When these contacts are closed, the lamp 86 is illuminated forming an alarm signal. The alarm signal occurs when the current flow through the coil 90 becomes sufficient to be associated with an overheated bearing assembly. Should the operator desire, he can momentarily close the switch 92. This then directs the current flow through the ammeter 82. When this occurs, he can then obtain an indication on the ammeter calibrated in degrees of temperature of the actual temperature. This will then govern his emergency actions. For instance, as he is only a short distance from his destination, and the temperature indicated is not relatively high, he can then drive on. If he determines that he has an overheated bearing and there are too many miles to travel before emergency assistance can be obtained, he can pull to the side of the road and let the bearing assembly cool. The indication on the ammeter 82 can be used to determine the advisability of splashing cool water on the entire wheel assembly if service is unavailable.

The arrangement of FIG. 5 is particularly adapted for use with a four-wheel trailer. Each indication is formed independently of the other wheels. With the switch 92 in the position illustrated, each alarm signal is formed independently. In theory, all four alarm signals can occur simultaneously.

The indicating apparatus shown in FIG. 5 is the more expensive and most sophisticated arrangement. It is particularly advantageous for larger or more expensive trailers and trailer pay loads.

The foregoing is directed to the preferred embodiment of the present invention. Numerous alterations in the present invention may be incorporated. By way of example and not limitation, the present invention is adapted for installation on a fixed, non-rotating axle supporting a single wheel or dual wheels. It can be used on fixed, non-rotating axles where the bearings are of different sizes, or are equal in size.

The scope of the present invention is determined by the claims which are appended hereto.

I claim:

1. For use with a non-rotating axle supporting a trailer frame member wherein the axle has a first bearing surface thereabout and an extended portion of a cylindrical shape extending to a second bearing surface thereabout wherein the axle supports two bearing assemblies on the bearing surfaces which support a hub for rotation about the axle with the hub adapted to be releasably connected to a rim and tire mounted on the rim, the improvement comprising a passage means formed in said axle extending to a point in said axle between said first and second bearing surfaces, temperature sensing means in said passage means responsive to an increase of temperature in said axle as a result of overheating the bearing assemblies, an output signal conductor from said sensing means, an indicator means connected to said sensing means for forming an indication of temperatures in said axle above a predetermined level, and the vehicle has at least two axles similarly protected by said sensor means connected to a common indicator means, therebeing a relay coil connected in series with each of said sensing means, a switch means closed by said relay coil on flowing a current above a predetermined level through said relay coil, a lamp connected in series with said switch means, a voltage source connected to said series connected lamp and switch means for applying power to said lamp when said switch means is closed but not when said switch means is open.

2. The structure of claim 1 wherein said sensing means includes a thermistor.

3. The structure of claim 1 including a switch means connected to said sensing means.

4. The structure of claim 1 wherein a plurality of axles have similarly arranged sensing means and all such sensing means are connected to a common indicator means, therebeing a switch means connected in series with each of said sensing means, and wherein said indicating means forms an indication dependent on the signal applied thereto by operation of said switch means.

5. The structure of claim 1 including a meter movement connected selectively to certain of said sensing means.

6. The structure of claim 5 wherein said meter movement is calibrated to indicate temperature.

7. The structure of claim 1 including a common voltage source for said sensing means.

8. The structure of claim 1 wherein said passage means is formed axially of said axle, and connects with a radially directed passage opening inboard of said first bearing surface and said conductor extends from said axle to a common location with conductors from other such axles and are connected to said indicating means at a location within view of an operator of a vehicle pulling the trailer frame.

9. The structure of claim 8 wherein said indicating means forms a visible and an audible indication.

10. The structure of claim 1 wherein said passage means is formed axially of said axle, and connects with a radially directed passage opening inboard of said first bearing surface.

* * * * *